United States Patent
Chakrabarti et al.

(10) Patent No.: US 7,266,762 B1
(45) Date of Patent: Sep. 4, 2007

(54) METHOD AND SYSTEM FOR DISTRIBUTED AUTONOMOUS MAINTENANCE OF BIDIRECTIONAL HYPERLINK METADATA ON THE WEB AND SIMILAR HYPERMEDIA REPOSITORY

(75) Inventors: Soumen Chakrabarti, Maharashtra (IN); Byron Edward Dom, Los Gatos, CA (US); David Andrew Gibson, Berkeley, CA (US); Kevin Snow McCurley, San Jose, CA (US); Martin Henk van den Berg, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 09/523,639

(22) Filed: Mar. 10, 2000

(51) Int. Cl.
*G06F 15/00* (2006.01)
*G06F 7/00* (2006.01)

(52) U.S. Cl. .................. 715/501.1; 715/512; 715/514; 715/530; 707/1; 707/3; 707/4; 707/205

(58) Field of Classification Search ............ 707/501.1, 707/4, 102, 3, 501, 205, 1; 709/206; 715/501.1, 715/512, 514, 530
See application file for complete search history.

(56) References Cited

U.S. PATENT DOCUMENTS

| | | | | |
|---|---|---|---|---|
| 5,437,008 A | | 7/1995 | Gay et al. ................. 395/161 |
| 5,712,979 A | | 1/1998 | Graber et al. .......... 395/200.11 |
| 5,717,860 A | | 2/1998 | Graber et al. .......... 395/200.12 |
| 5,745,122 A | | 4/1998 | Gay et al. ................. 345/433 |
| 5,937,163 A | * | 8/1999 | Lee et al. .................... 707/102 |
| 5,999,929 A | * | 12/1999 | Goodman ...................... 707/7 |
| 6,029,141 A | * | 2/2000 | Bezos et al. .................. 705/27 |
| 6,184,886 B1 | * | 2/2001 | Bates et al. .............. 715/501.1 |
| 6,256,648 B1 | * | 7/2001 | Hill et al. ................. 715/501.1 |
| 6,393,462 B1 | * | 5/2002 | Mullen-Schultz .............. 707/4 |
| 6,424,966 B1 | * | 7/2002 | Meyerzon et al. ............. 707/3 |
| 6,460,038 B1 | * | 10/2002 | Khan et al. .................... 707/10 |
| 6,484,149 B1 | * | 11/2002 | Jammes et al. ............... 705/26 |
| 6,493,702 B1 | * | 12/2002 | Adar et al. ..................... 707/3 |
| 6,513,031 B1 | * | 1/2003 | Fries et al. ..................... 707/3 |
| 6,546,393 B1 | * | 4/2003 | Khan .......................... 707/10 |
| 6,549,941 B1 | * | 4/2003 | Jaquith et al. .............. 709/219 |
| 6,631,496 B1 | * | 10/2003 | Li et al. .................. 715/501.1 |

OTHER PUBLICATIONS

Frecon, E., Smith, Gareth, WebPath—A Three Dimensianal Web History, Information Visualization, 1998. Proceedings, IEEE Symposium on Oct. 19-20, 1998, pp. 3-10.*

Gandhi, R et al., Domain Name Based Visualization of Web Histories in a Zoomable User Interface, Database and Expert Systems Applications, 2000. Proceedings, 11th International Workshop on 2000, pp. 591-598.*

* cited by examiner

*Primary Examiner*—Doug Hutton
*Assistant Examiner*—Chau Nguyen
(74) *Attorney, Agent, or Firm*—John L. Rogitz

(57) ABSTRACT

A Web server stores a table of Web page inlinks. When a Web page is accessed and a user wants to access other pages related to the accessed page, the user requests the table of inlinks, and from it generates a list of sibling links to the accessed page, the sibling links being outlinks of one or more of the inlinks in the table.

6 Claims, 3 Drawing Sheets

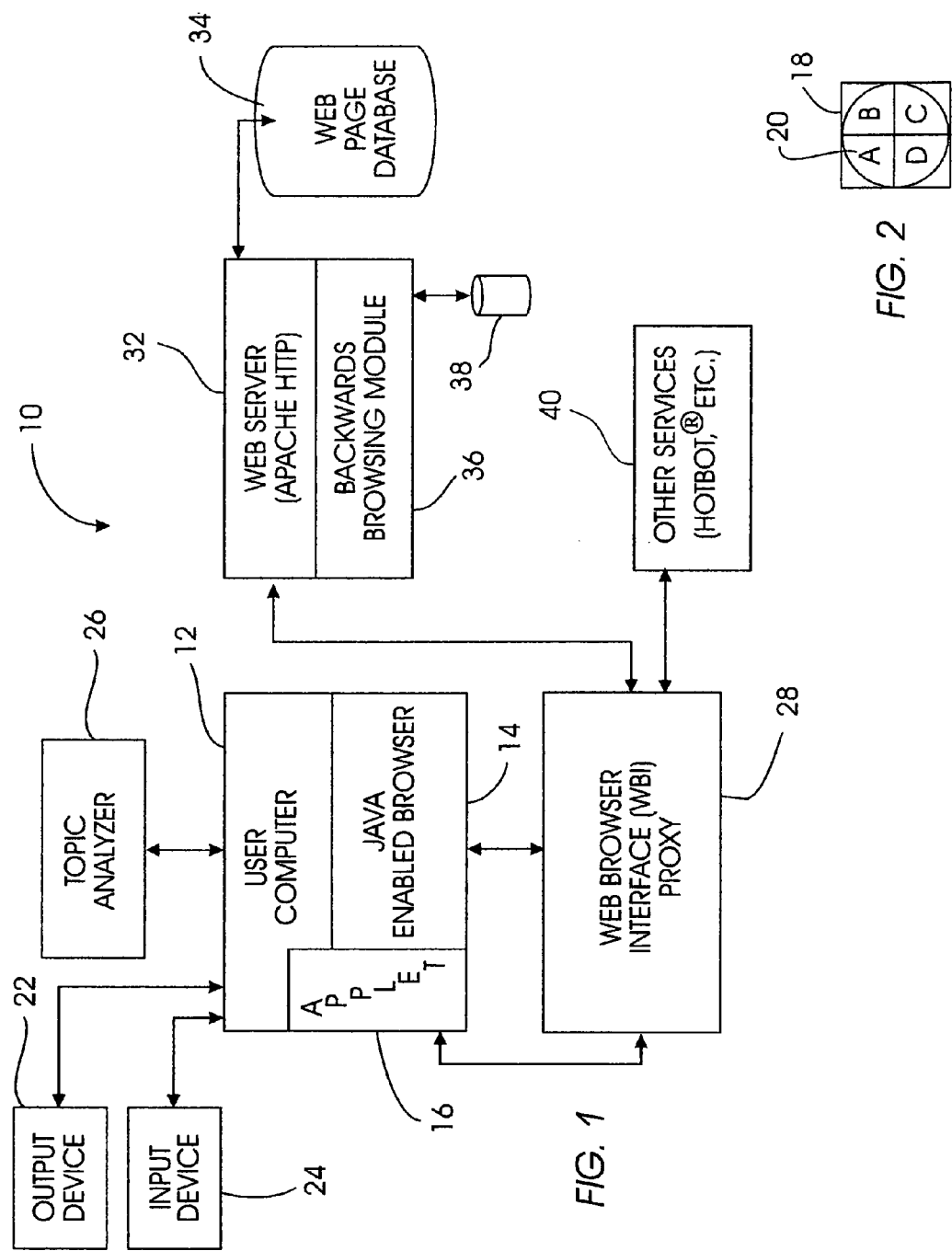

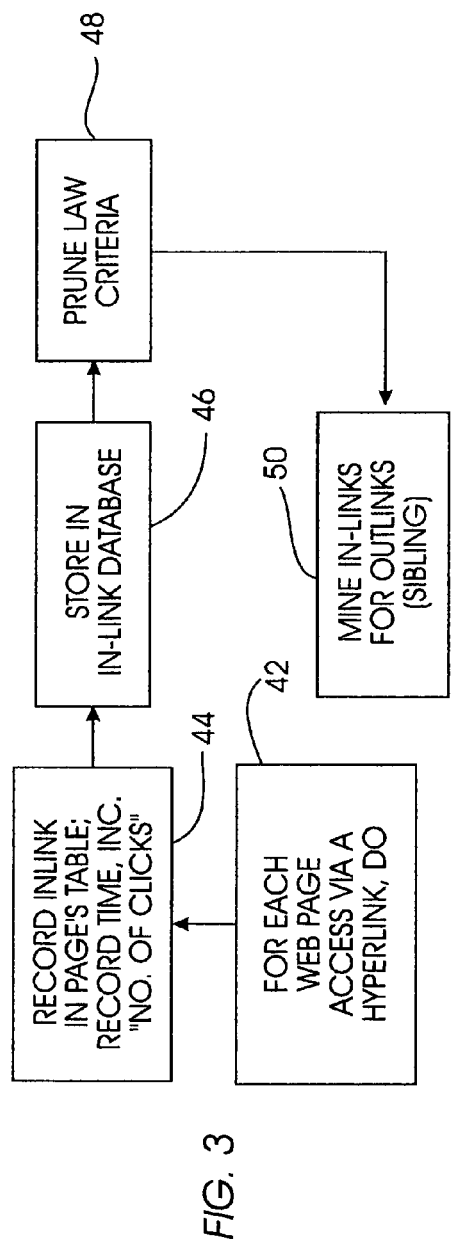
FIG. 3
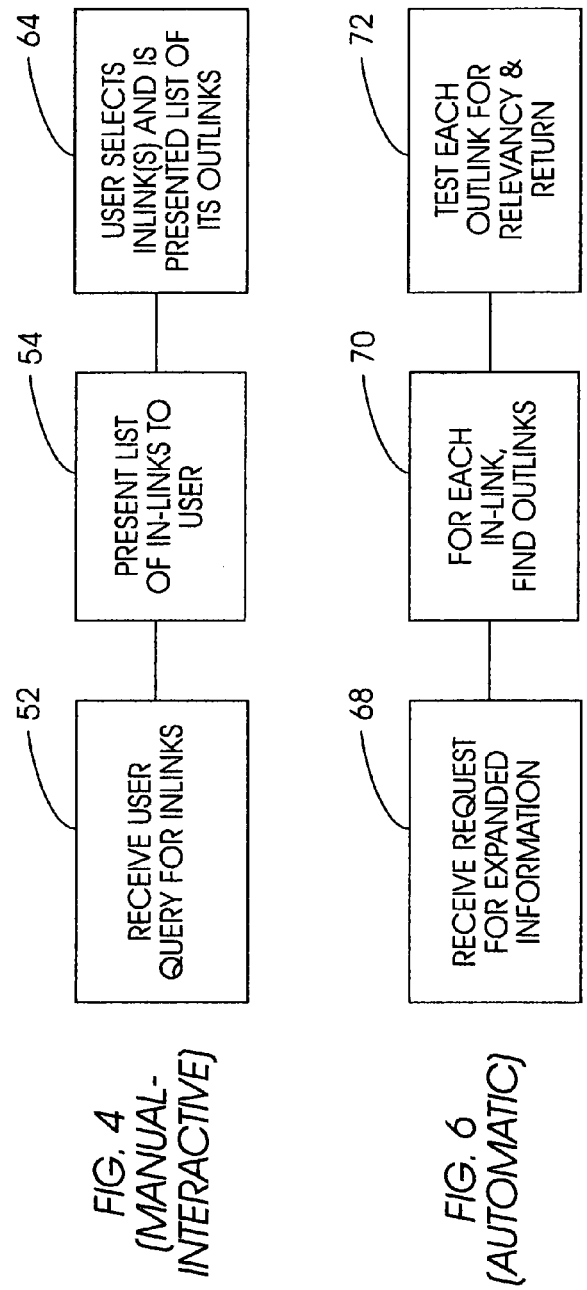
FIG. 4 (MANUAL-INTERACTIVE)
FIG. 6 (AUTOMATIC)

METHOD AND SYSTEM FOR DISTRIBUTED AUTONOMOUS MAINTENANCE OF BIDIRECTIONAL HYPERLINK METADATA ON THE WEB AND SIMILAR HYPERMEDIA REPOSITORY

BACKGROUND OF THE INVENTION

1. Field of the Invention

The present invention relates generally to searching wide area computer networks for information, and more particularly to searching the World Wide Web for topical information.

2. Description of the Related Art

The wide area computer network known as the "World Wide Web", or simply "Web", contains a vast amount of information in the form of Web pages. Each Web page is electronically stored in a respective Web site on a computer, referred to as a Web server, with the Web itself including many Web servers that are interconnected by means of the Internet. A person can connect a computer to the Internet via, e.g., a telephone line, and thereby electronically access the Web pages on the Web servers.

As the Web has grown, many millions of Web pages have been created. In other words, the Web contains a vast amount of information, and the content of the Web grows and changes minute by minute. It will accordingly be appreciated that some means must be provided for a person to sort through the vast quantities of Web pages to find a particular item of interest.

With the above consideration in mind, most users employ software known as Web browsers when accessing the Web. To search the Web for a particular topic of information, the user causes their Web browser to access a Web site of a centralized search engine that is maintained by a search company. Examples of currently popular search engines are Alta Vista™ and Hotbot™.

Centralized search engines use software referred to as "crawlers" to continuously access Web pages and log and categorize the pages in a centralized index. When a person wishes to retrieve information, the person's browser accesses a centralized search engine using a query, for example. "luxury cars". In response, software at the centralized engine accesses its index to retrieve names of Web sites considered by the search engine to be appropriate sources for the sought-after information. The search engine transmits to the browser hyperlinks to the retrieved sites, along with brief summaries of each site, with the browser presenting the information to the user. The user can then select the site or sites they want by causing the browser to access the site or sites.

Owing to the burgeoning of the Web and the ever-growing amount of its information, and the fact that the above-described centralized crawler schemes posture themselves to respond to any possible query (i.e., to be all things to all people), centralized crawler/searchers require large investments in hardware and software and must never cease crawling the Web, to index new pages and to periodically revisit old pages that might have changed. Indeed, one Web search company currently requires the use of 16 of the most powerful computers made by a major computer manufacturer, each computer having 8 gigabytes of memory. Another search company currently uses a cluster of 300 powerful workstations and over one terabyte of memory to crawl over 10 million Web pages per day. Despite these heroic efforts, however, it is estimated that a single search company is able to index only 30%-40% of the Web, owing to the size of the Web which, incidentally, shows no signs of slowing its rate of expansion.

Accordingly, one problem with current technology that is recognized and addressed by the present invention is the need to reduce the vast amount of Web search hardware and software that is inherently required by a centralized search scheme.

Additionally, evaluating whether a particular Web page contains relevant information with respect to a user query is sometimes difficult. Moreover, user queries may not be effectively articulated, or they may be overbroad. Consequently, a Web search engine frequently responds to a query by returning a large number of Web pages that are of little or no interest to the requester. Nonetheless, a user must laboriously sort through hundreds and perhaps thousands of returned Web pages, which, as discussed above, can be considered to represent only 30%-40% of the total Web content in any case. Moreover, because a centralized crawler seeks the capability to respond to any query, most of the index of any single centralized system contains information that is of little or no value to any single user or indeed to any single interrelated group of users.

Thus, two other problems recognized and addressed by the present invention are the lack of focus of search results, and the fact that centralized crawlers are not tailored to any particular user or to any particular interrelated group of users and, thus, contain mostly irrelevant information, from the point of view of a single user or group of users.

In addition to the above considerations, the present invention recognizes that many if not most Web pages refer to other Web pages by means of hyperlinks, which a user can select to move from a source Web page to a target Web page. The present invention further recognizes that such hyperlinks are more than simply navigation tools; they are important categorization tools as well. More specifically, a particularly "good" page on a certain topic might be referred to by a large number of other pages, and thus the number of referrals (referred to as "inlinks") to a Web page is an indication of its effectiveness.

It happens that with the existing Web communication protocol (hypertext transfer protocol, or "http"), when a user clicks on a hyperlink to a target Web page v from a source Web page u, the user's browser sends the identity of the source Web page u to the Web server that hosts the target Web page v, and this information can be recorded or logged. Unfortunately, current logs of which Web pages refer to which other Web pages are mostly unused and indeed mostly not enabled by Web site managers, and the logs moreover consume a relatively large amount of electronic data storage space. Also, no standard way exists for a remote user to access and use the information in the logs.

The present invention, however, recognizes the above-noted problem and addresses how to exploit this currently unused but potentially valuable information in the context of resolving the unfocussed, centralized crawling problems noted above.

SUMMARY OF THE INVENTION

The invention is a general purpose computer programmed according to the inventive steps herein to undertake effective information searching on the World Wide Web. The invention can also be embodied as an article of manufacture—a machine component—that is used by a digital processing apparatus and which tangibly embodies a program of instructions that are executable by the digital processing apparatus to perform the present logic. This invention is realized in a critical machine component that causes a digital processing apparatus to perform the inventive method steps herein.

Accordingly, a computer system embodying the present invention can include a user computer, a data input device associated with the user computer, and a Web server communicating with the user computer. Server logic means at the Web server generates a table of inlinks to at least one Web page that is associated with the Web server, and user logic means at the user computer access the table of inlinks to facilitate generating a list of sibling links based on the table. As intended herein, each sibling link is an outlink of one of the inlinks in the table, and the sibling links can be searched for information that is relevant to the Web page associated with the inlink table.

In a preferred embodiment, the user logic means includes means for downloading the table from the Web server to the user computer. Each inlink on the table is a hyperlink to a respective Web site, such that a person operating the user computer can select one of the inlinks to download the Web site associated with the selected inlink. Alternatively, the user logic means can include means for downloading the table from the Web server to the user computer, and means for automatically accessing the inlinks to search the inlinks for predetermined information, i.e., information that is relevant to a predefined topic.

In the preferred embodiment of the present invention, a data storage device stores at least portions of the inlink table. Means at the Web server prune inlinks in the table in response to at least one preselected criterion, such as a number of selections of each inlink, so that the table fits within the capacity of the data storage device.

In another aspect, a computer-implemented method is disclosed for accumulating information on the World Wide Web that is relevant to at least one topic. The method includes generating a list of inlinks at a Web server for at least one Web page associated with the server, and, at a user computer, downloading the list of inlinks for facilitating information retrieval using the list.

In still another aspect, a computer program device includes a computer program storage device readable by a user computer and a program on the program storage device. The program includes instructions that are executable by the user computer for performing method steps for searching the World Wide Web. The method steps include downloading a Web page from a Web server and requesting an inlinks or backlinks list associated with the Web page. Also, the method steps required by the program include receiving from the Web server the list of inlinks or backlinks to the Web page, in response to the requesting step.

In still another aspect, a computer program device includes a computer program storage device readable by a Web server and a program on the program storage device. The program includes instructions executable by the Web server for performing method steps for compiling information useful for searching the World Wide Web. The method steps include receiving hyperlink requests for Web pages, with each hyperlink request being sent from an inlink. Also, the method steps include recording at least some inlinks along with one or more inlink criteria, and then transmitting the inlinks to user computers that request the inlinks.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram of the present system.
FIG. 2 is a schematic diagram of a computer program device or product;
FIG. 3 is a flow chart of the overall logic;
FIG. 4 is a flow chart of the manual search logic;
FIG. 6 is a flow chart of the automatic search logic.

DETAILED DESCRIPTION OF THE PREFERRED EMBODIMENTS

Figure 5:
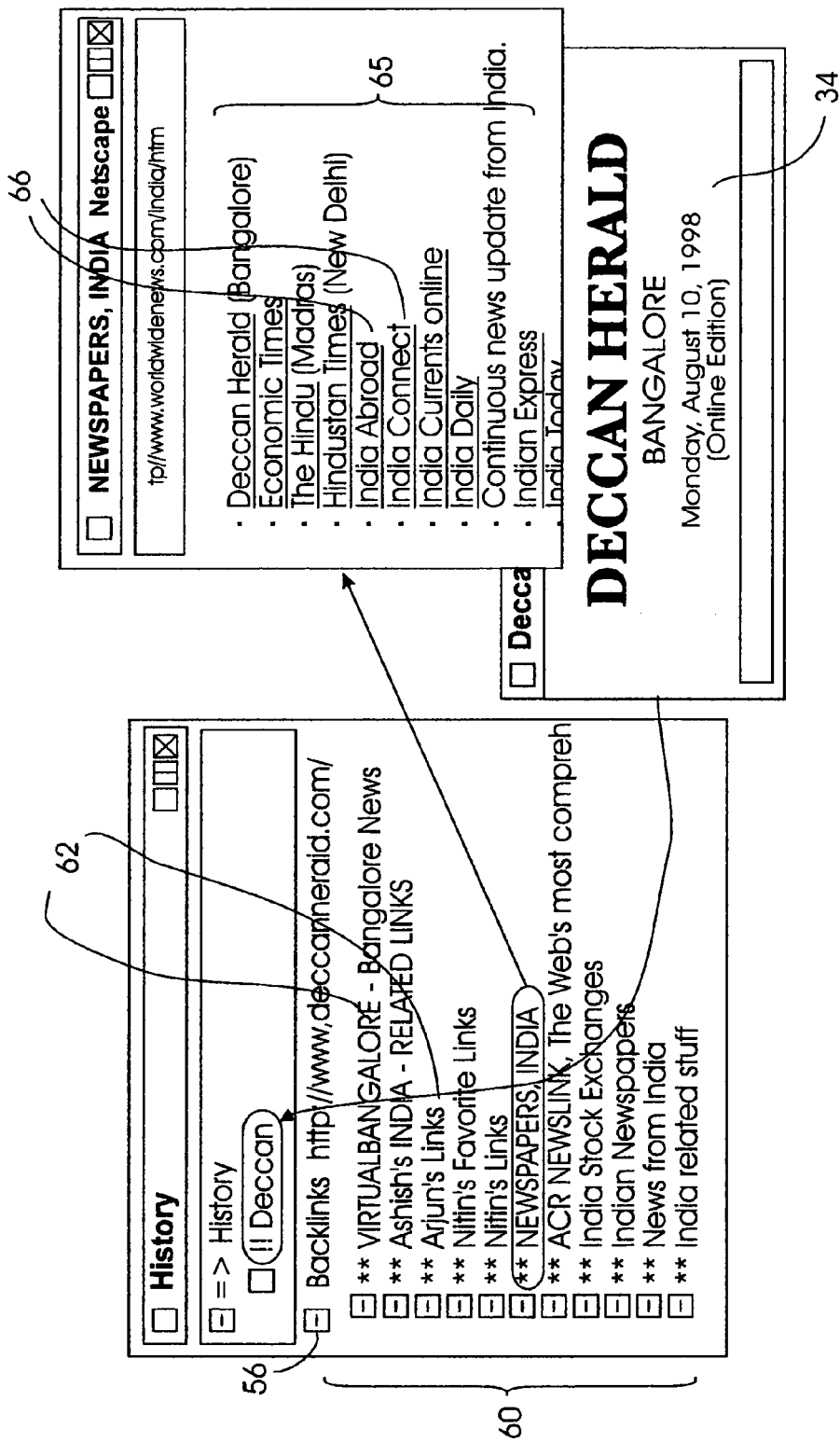
FIG. 5 is a diagram of an inlinks table and sibling link table.

Referring initially to FIG. 1, a system for effective World Wide Web information searching is shown, generally designated 10. In the particular architecture shown, the system 10 includes a digital processing apparatus, such as at least one user computer 12. In one intended embodiment, the user computer 12 may be a personal computer made by International Business Machines Corporation (IBM) of Armonk, N.Y. as shown, or the user computer 12 may be any computer, including computers sold under trademarks such as AS400, with accompanying IBM Network Stations. Or, the user computer 12 may be a Unix computer, or OS/2 server, or Windows NT server, or IBM RS/6000 250 workstation with 128 NIB of main memory running AIX 3.2.5., or an IBM laptop computer.

The user computer 12 includes a JAVA enabled computer network browser 14 and an inlink request applet 16 which may be executed by a processor within the computer 12 as a series of computer-executable instructions. These instructions may reside, for example, in RAM of the computer 12.

Alternatively, the instructions may be contained on a data storage device with a computer readable medium, such as a computer diskette 18 shown in FIG. 2 and having a computer readable medium 20 with program code elements A-D thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{-+}$ compatible code. In any case, it is to be understood that the flow charts show the function of the logic undertaken by the applet 16.

FIG. 1 also shows that the system 10 can include peripheral computer equipment known in the art, including one or more output devices 22 such as a video monitor and one or more input devices 24 such as a computer keyboard. Other output devices can be used such as printers, other computers, and so on. Likewise, input devices other than a keyboard can be used, e.g., a mouse, or trackballs, keypads, touch screens, and voice recognition devices. Also, a topic analyzer 26, such as the topic analyzer disclosed in U.S. Pat. No. 6,389, 436, incorporated herein by reference and owned by the present assignee, can be accessible to the user computer 12.

In accordance with principles known in the art, the user computer 12 can use a Web browser interface (WBI) proxy 28 to communicate via the Internet 30 with one or more Web servers 32. In one preferred embodiment, the Web server 32 uses Apache® hypertext transfer protocol (http). The Web server 32 includes one or more Web pages 34, depicted in FIG. 1 as being portions of a Web page database, for sending a Web page to a user computer 12 upon user request.

Additionally, the Web server 32 includes a backwards browsing module 36 that functions in accordance with logic shown in the accompanying flow charts. The backwards browsing module 36 accesses a small (e.g., about five megabytes) inlink or backlink database 38. If desired, the user computer 12 can access other services 40, including conventional Web search services such as Hotbot®, via the internet 30.

Now referring to FIG. 3, at block 42 for each Web page 34 accessed via a hyperlink to that page, the Web server 32 enters a "DO" loop to undertake the following. As recognized by the present invention, when a user hyperlinks to a target page from a source page, the identity of the source page is recorded by the Web server of the target page. Accordingly, the Web server 32 proceeds to block 44 to record the inlink (i.e., the identity of the source page from which the user is being linked) in a list, preferably a table, for the Web page being linked to (the target page). The list or table is a map between uniform resource locators (URLs) of Web pages and their associated integer identifications. Also, the time the target page was accessed is recorded, and a counter associated with the inlink is incremented by unity each time the target Web page is accessed from that source page. As used herein, the terms "inlink" and "backlink" interchangeably mean a hyperlink on a source Web page that a user can "click" on using, e.g., a mouse, to download a target Web page.

One exemplary data structure generated at block 44 is: from_ID, to_ID, Num_Clicks, Last_Click_Time, wherein from_ID is the source page, to_ID is the target page being linked to, Num_Clicks is the number of times users have accessed the target page from the source page, and Last_Click_Time is the date and time of the most recent access of the target page from the associated source page.

From block 44 the logic proceeds to block 46 to store the inlinks in the backlink database 38. Next, proceeding to block 48 the list or table of inlinks can be pruned in accordance with one or more predetermined criteria to conform to the relatively small size of the backlink table 38. For example, inlink table records with Last_Click_Times earlier than a predetermined aged time, or with a Num_Clicks entry smaller than a predetermined integer, or some combination of the above two criteria, can be pruned from the inlinks table at block 48. As described in detail below, the process can then move to block 50 to mine the inlink table of a Web page for sibling links, i.e., outlinks of inlink entries in the inlinks table.

FIGS. 4-6 show example details of the mining that can occur at block 50 in FIG. 3. At block 52 in FIG. 4, for instance, a user can generate a query for inlinks by appropriately manipulating the input device 24 (FIG. 1) to download, at block 54, the inlinks list from the Web server 32 of a Web page 34. Referring to FIG. 5, the query can be generated by, e.g., clicking on an inlink or backlink button 56 on a screen display 58 of the Web page as presented on the output device 22 of the user computer 12. The displays shown in FIG. 5 are actual screen displays generated by an encoded version of the present invention. By clicking on the inlink or backlink button 56, the user can generate a new type of http request having, as one example, the syntax INLINK/photo/edscott/spectsel.htm HTTP/1.0 (wherein the name of the Web server in the exemplar is "www.photo.net").

In response, an inlinks or backlinks list 60 containing plain text names of inlinks 62 from a Web page 34 (in the example shown, "DECCAN HERALD") is presented to the user. A variety of simple reply formats can be provided, such as:

<html>
<ahref="http://www/yahoo.com/Arts/Photography/Infrared/">15.894046903</a><br>
<ahref="http://www/infoseek.com/Recreation/Photography/">6.894046903</a><br>
</html>

In the above examples, the first number is the number of clicks ("Num_Clicks") and the second is the latest click time ("Last_Click_Time") for that link at the server, with the remaining data indicating the name of the inlink. Such a response can be readily parsed or viewed at the user computer 12 by the browser 14.

Moving to block 64 of FIG. 4 and still referring to FIG. 5, a user can click on one of the inlinks (in the example shown, "NEWSPAPERS, INDIA") to access the Web page 34 associated with the inlink and, more particularly, to be presented with a list 65 of outlinks 66 from the inlink page. These outlinks are sibling links to the web page 34 associated with the inlink list 60. As understood herein, the sibling links can be expected to be relevant to the web page associated with the inlink list 60.

The above process can be automated if desired. For example, referring now to FIG. 6, at block 68 the Web server 32 can receive a query for Web pages from a Web crawler, e.g., the crawler disclosed in our co-pending U.S. patent application Ser. No. 09/239,921, owned by the same assignee as the present invention and incorporated herein by reference. The crawler can be associated with the user computer 12, and an inlink table would thus be returned to the user computer 12. At block 70, the crawler could test each inlink seriatim for relevancy to a predefined topic using the topic analyzer 26 (FIG. 1) and also find the outlinks to each inlink. Moving to block 72, the outlinks likewise can be tested for relevancy to a predefined topic. Thus, the process shown in FIG. 6 is essentially a backwards crawling process.

In one preferred embodiment, the crawler can undertake the above steps by running a CGI program that prints out a sequence of sections. Each section title (in <h1>, for example) is a URL and the section consists of lines as above. It is also possible to add a non-text interface for efficiency, in which case the transmission format of the database would require standardization as a new MIME type, for example, application/inlink-table. The new request, in one example, might look like:

INLINK/photo/edscott/spectsel.htm HTTP/1.0
accept: application/inlink-table
accept: text/html
accept: text/plain While the particular METHOD AND SYSTEM FOR DISTRIBUTED AUTONOMOUS MAINTENANCE OF BIDIRECTIONAL HYPERLINK METADATA ON THE WEB AND SIMILAR HYPERMEDIA REPOSITORY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:
1. A computer system, comprising:
at least one user computer;
a data input device associated with the user computer;
a Web server communicating with the user computer;

server logic means at the Web server for generating a table of inlinks to at least one Web page associated with the Web server, at least one inlink including information related to a source page and information related to a target page linked to from the source page; and user logic means at the user computer for accessing the table of inlinks to facilitate generating a list of sibling links based on the table, each sibling link being an outlink of one of the inlinks in the table, for accessing the sibling links.

2. The system of claim 1, wherein the user logic means includes means for downloading the table from the Web server to the user computer, each inlink on the table being a hyperlink to a respective Web site, such that a person operating the user computer can select one of the inlinks to invoke the Web site associated with the selected inlink.

3. The system of claim 1, wherein the user logic means includes:

means for downloading the table from the Web server to the user computer; and means for automatically accessing the inlinks to search the inlinks for predetermined information.

4. The system of claim 1, further comprising a data storage device for storing at least portions of the table.

5. The system of claim 4, further comprising means at the Web server for pruning inlinks in the table in response to at least one preselected criterium.

6. The system of claim 5, wherein the preselected criterium is based at least in part on a number of selections of each inlink.

* * * * *